(12) United States Patent
Mollick et al.

(10) Patent No.: US 6,340,280 B1
(45) Date of Patent: *Jan. 22, 2002

(54) AMUSEMENT RIDE VEHICLE WITH WHEELCHAIR RAMP

(75) Inventors: Horst Mollick; Dieter Hopfner, both of Offenberg (DE)

(73) Assignee: Universal City Studios, Inc., Universal City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,528

(22) Filed: Dec. 30, 1998

Related U.S. Application Data (63) Continuation-in-part of application No. 09/082,144, filed on May 20, 1998, now Pat. No. 6,227,790.

(51) Int. Cl.⁷ .................................................. B60P 1/00
(52) U.S. Cl. ...................... 414/537; 414/541; 414/545; 414/921; 472/43
(58) Field of Search ................................ 414/537, 522, 414/921, 541, 545, 546, 462; 472/29, 36, 43, 59; 296/61; 105/436

(56) References Cited

U.S. PATENT DOCUMENTS

| | | | |
|---|---|---|---|
| 2,449,829 A | 9/1948 | Agren | 14/69.5 |
| 3,467,026 A | 9/1969 | Broggie et al. | 105/341 |
| 3,757,972 A | * 9/1973 | Martin | 414/462 |
| 3,838,648 A | * 10/1974 | Dahlberg et al. | 104/139 |
| 4,103,934 A | 8/1978 | Arnholt et al. | 280/807 |
| 4,155,468 A | 5/1979 | Royce et al. | 414/556 |
| 4,170,368 A | 10/1979 | Southward et al. | 286/250.1 |
| 4,306,634 A | 12/1981 | Sangster | 414/921 |
| 4,352,218 A | 10/1982 | Lundberg | 114/363 |
| 4,420,286 A | 12/1983 | Hanson et al. | 414/545 |
| 4,457,663 A | * 7/1984 | Hem et al. | 414/921 |
| 4,479,753 A | * 10/1984 | Thorley | 414/921 |
| 4,522,390 A | 6/1985 | Kudler | 142/47 |
| 4,616,373 A | * 10/1986 | Perez | 414/537 |
| 4,624,619 A | * 11/1986 | Uher | 414/537 |
| 4,759,682 A | * 7/1988 | Hood | 414/522 |
| 4,787,111 A | * 11/1988 | Pacek et al. | 414/921 |
| 4,865,312 A | 9/1989 | Katz | 472/116 |
| 4,971,510 A | * 11/1990 | Houle | 414/921 |
| 5,026,243 A | * 6/1991 | Dell | 414/537 |
| 5,040,936 A | 8/1991 | Rhea | 414/921 |
| 5,052,879 A | * 10/1991 | Wolfe | 414/541 |
| 5,110,252 A | 5/1992 | Aoki | 414/921 |
| 5,147,104 A | * 9/1992 | Zalewski | 414/921 |
| 5,154,569 A | * 10/1992 | Eryou et al. | 414/921 |
| 5,165,389 A | 11/1992 | Jing-Qi et al. | 472/36 |
| 5,180,275 A | * 1/1993 | Czech et al. | 414/541 |
| 5,257,894 A | * 11/1993 | Grant | 414/537 |
| 5,259,081 A | 11/1993 | Henderson | 296/61 |

(List continued on next page.)

Primary Examiner—Donald P. Walsh
Assistant Examiner—Paul T. Chin
(74) Attorney, Agent, or Firm—Lyon & Lyon LLP

(57) ABSTRACT

An amusement ride vehicle includes a floor deck assembly slideably mounted inside the body of the vehicle when the vehicle is in motion and telescopically extended away from the body toward a loading platform when the vehicle is at rest. A ramp assembly is supported by the floor deck assembly and may be deployed to accommodate a guest in a wheelchair. To promote safety, the ramp and vehicle door preferably have automatic latch mechanisms. Also for safety purposes, if the vehicle door is not completely pushed back or closed in the locked position, an override switch connected to the door release mechanism, prevents the ride from running. To maintain the ride capacity at all times, a companion seat is built into the vehicle body and a conversion seat can be deployed if no guest in a wheelchair is being accommodated.

16 Claims, 10 Drawing Sheets

U.S. PATENT DOCUMENTS

| | | | |
|---|---|---|---|
| 5,331,701 A | * 7/1994 | Chase et al. | 414/921 |
| 5,375,962 A | 12/1994 | Kempf | 414/541 |
| 5,380,144 A | 1/1995 | Smith et al. | 414/537 |
| 5,382,130 A | 1/1995 | Kempf | 414/545 |
| 5,393,192 A | 2/1995 | Hall et al. | 414/537 |
| 5,499,694 A | 3/1996 | Dorn | 414/921 |
| 5,564,984 A | 10/1996 | Mirabella et al. | 414/921 |
| 5,570,989 A | * 11/1996 | Belanger | 414/537 |
| 5,595,470 A | * 1/1997 | Berkey et al. | 414/921 |
| 5,613,825 A | 3/1997 | Dorn | 414/543 |
| 5,636,399 A | * 6/1997 | Tremblay et al. | 414/537 |
| 5,676,515 A | * 10/1997 | Haustein | 414/921 |
| 5,769,480 A | * 6/1998 | Gebhartdt | 414/522 |
| 5,795,125 A | * 8/1998 | Walkden | 14/71.1 |
| 5,803,523 A | * 9/1998 | Clark et al. | 414/537 |
| 5,806,632 A | * 9/1998 | Budd et al. | 414/921 |
| 5,829,201 A | 11/1998 | Schelter et al. | 414/921 |
| 5,829,945 A | * 11/1998 | Stanley | 414/537 |
| 5,832,555 A | * 11/1998 | Saucier et al. | 414/921 |
| 5,865,593 A | 2/1999 | Cohn | 414/545 |
| 5,871,329 A | 2/1999 | Tidrick et al. | 414/537 |
| 5,884,563 A | * 3/1999 | Sheldon et al. | 414/921 |
| 5,890,869 A | * 4/1999 | LeMaster et al. | 414/921 |
| 5,907,276 A | * 5/1999 | Lance | 414/537 |
| 5,935,011 A | 8/1999 | Morgan et al. | 414/462 |
| 6,042,923 A | * 3/2000 | Lewis | 414/537 |
| 6,102,648 A | * 8/2000 | Fretwell et al. | 414/522 |

* cited by examiner

AMUSEMENT RIDE VEHICLE WITH WHEELCHAIR RAMP

CROSS-REFERENCES TO RELATED APPLICATIONS

This application is a continuation-in-part of U.S. patent application Ser. No. 09/082,144, filed May 20, 1998, now U.S Pat. No. 6,227,790 and incorporated herein by reference.

BACKGROUND OF THE INVENTION

The field of the invention is amusement ride vehicles.

Amusement rides have been enjoyed by millions of people, and especially young people, for many years. Most rides, however, do not accommodate guests in wheelchairs. This is because most ride vehicles have some type of threshold at the vehicle entrance requiring the guest to step over during entry and exiting the vehicle. In addition, most ride vehicles have permanent seating arrangements typically in the form of benches stretching the width of the vehicle. Finally, most amusement rides are usually propelled along a fixed track. Due to safety concerns, the ride vehicle is properly located a distance away from, and typically at a different elevation than, the ride loading platform. As a result, guests in wheelchairs usually find themselves waiting on the loading platform for an attendant or assistant to help them onto and off the typical ride vehicle.

Recently there has been an increased emphasis in providing assistance to wheelchair users to conveniently and safely enter and exit a motor vehicle. Most of these efforts involve motorized ramps or hydraulic lifts which require significant time to deploy and space to store within the motor vehicle. However, few, if any, of these improvements have been used in the amusement ride industry. This is unfortunate. An amusement ride vehicle that accommodates a guest in a wheelchair solving the aforementioned problems is therefore needed.

SUMMARY OF THE INVENTION

The present invention is directed to an amusement ride vehicle having an integral wheelchair ramp. The ramp is associated with a floor deck assembly designed to telescope out from the vehicle for guest access. To these ends, the floor deck assembly advantageously has a set of I-track guiderails slideably mounted to the frame of the vehicle. For the preferred embodiment, a set of L-track guiderails is slideably mounted to the I-track guiderails, and a support platform on the L-track guiderails functions as the floor of the vehicle when the vehicle is in motion. When the vehicle is at rest, the floor deck assembly is extended away from the vehicle body, over water or other scenery, and stopped above the loading platform in order to deploy the wheelchair ramp.

In this manner, a guest in a wheelchair can advantageously proceed up the ramp and onto the floor of the vehicle, wait for the park operator to return the ramp to the operational position, slide the floor deck assembly back into the vehicle body, and enjoy an amusement ride without having to leave their wheelchair or turn it towards the direction of flow of the ride. To promote safety, the ramp and vehicle door preferably have automatic latch mechanisms. To maintain the ride capacity at all times, a companion seat may be attached to the frame of the vehicle with a conversion seat hidden underneath the companion seating area if no guest in a wheelchair is being accommodated.

Accordingly, it is an object of the present invention to provide an amusement ride vehicle that accommodates a guest in a wheelchair. Other and further objects and advantages of the present invention will be further understood and appreciated by those skilled in the art by reference to the following specification, claims, and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
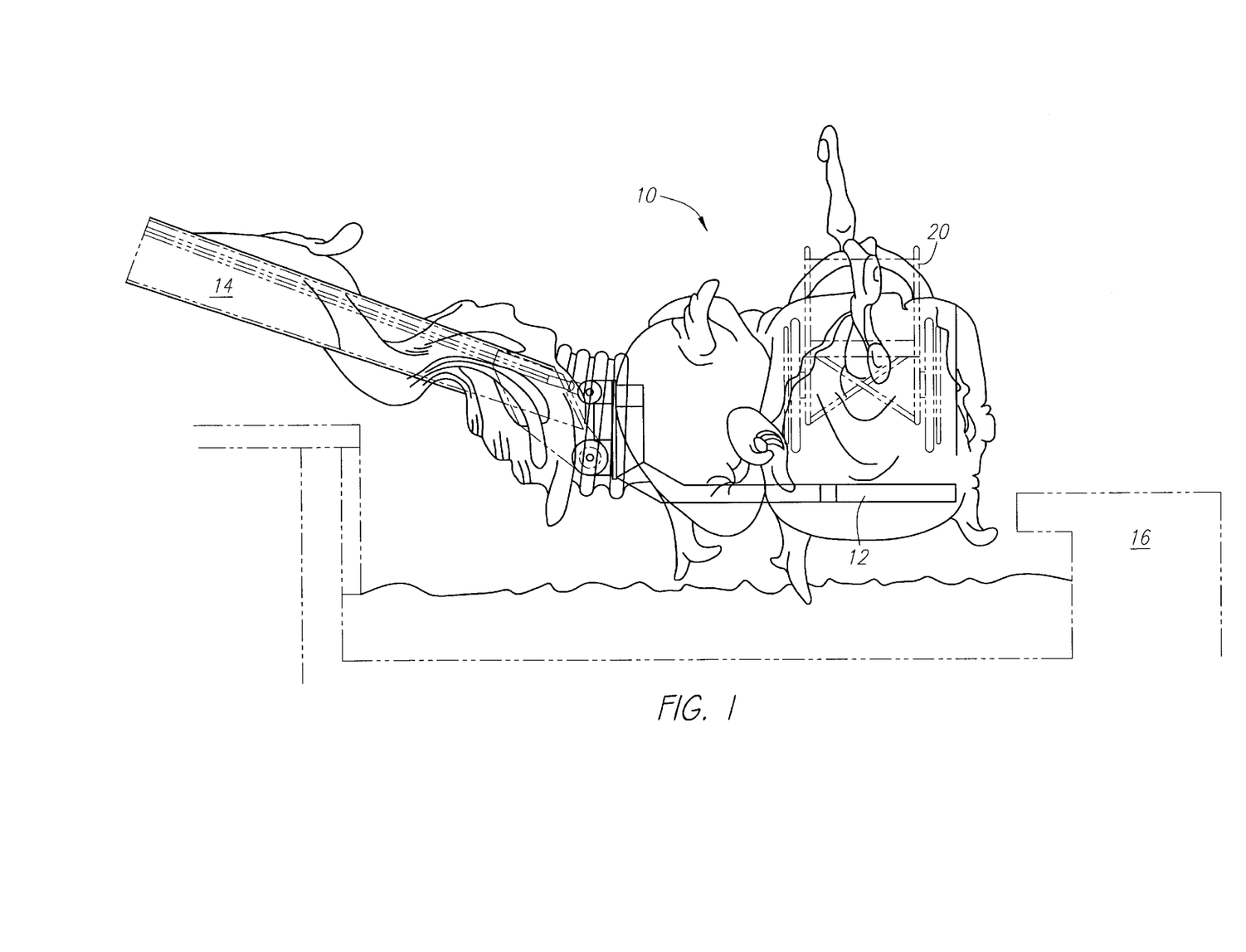
FIG. 1 is a rear environmental view of the amusement ride vehicle with wheelchair ramp according to a preferred embodiment of the present invention.
Figure 2:
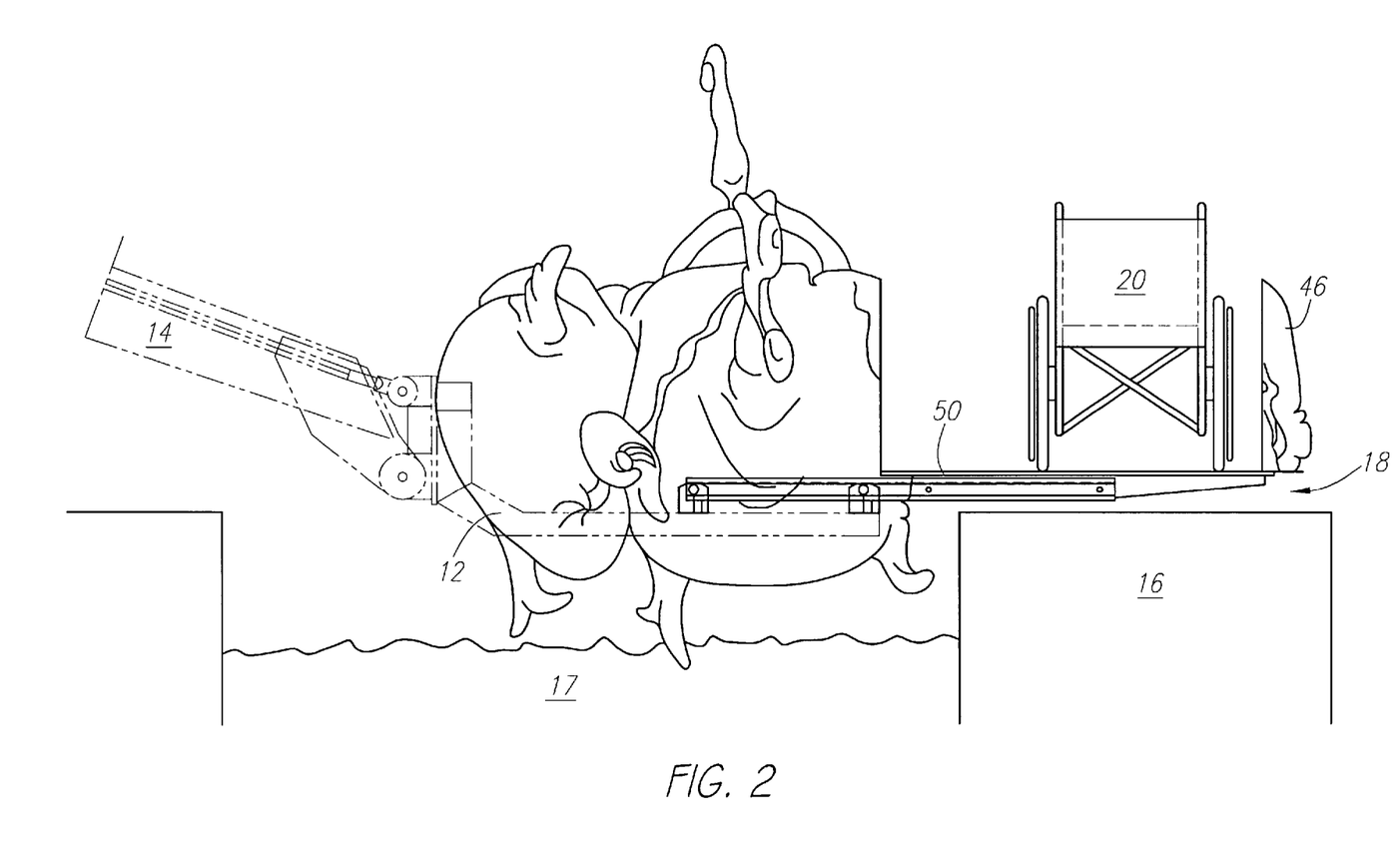
FIG. 2 is a rear view of the vehicle shown in FIG. 1 with the floor deck assembly in an extended position.

Turning in detail to the drawings, as shown in FIGS. 1, 2, 8, and 9, the amusement ride vehicle 10 has two support beams 12 mounted to an arm 14. The arm 14 supports the vehicle 10 over water 17 or other scenery as the vehicle 10 travels about a fixed circular path. The vehicle 10 is elevated above and a safe distance from the loading platform 16 where guests are positioned for the next ride. Referring to FIG. 2, the vehicle 10 has a floor deck assembly 18 supported by the support beams 12. A wheelchair 20 can be seen positioned on the floor or support platform 50 of the floor deck assembly 18 at an elevation above the loading platform 16. As shown in FIG. 2, the floor deck assembly 18 is adapted to telescopically extend away from the vehicle 10, over the water 17, and stop above the loading platform 16. In both FIGS. 1 and 2, the forward direction of the wheelchair 20 is also the direction of the flow of the ride.

Figure 3:
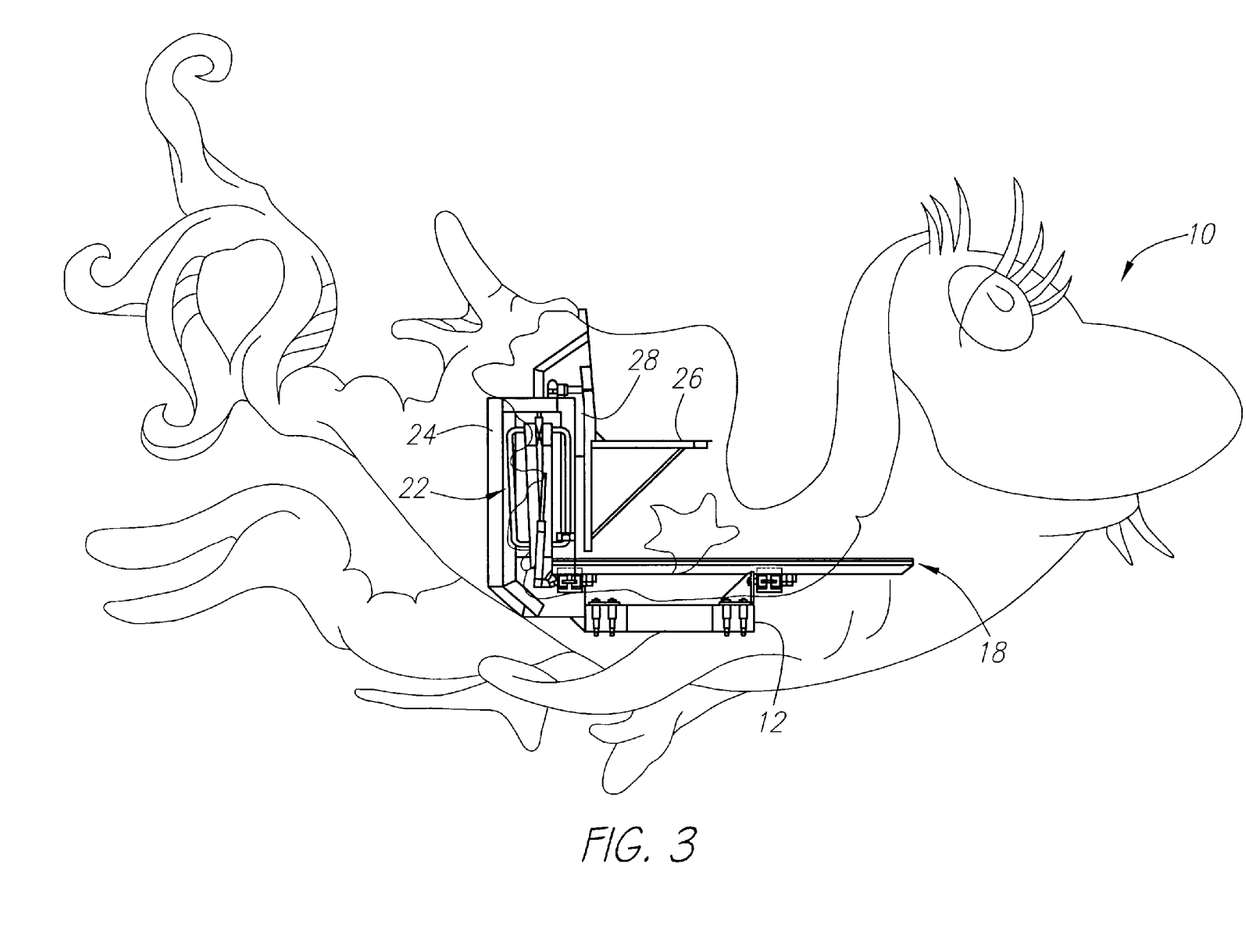
FIG. 3 is a right side view of the vehicle shown in FIG. 1 with the ramp assembly in the retracted operational position.
Figure 4:
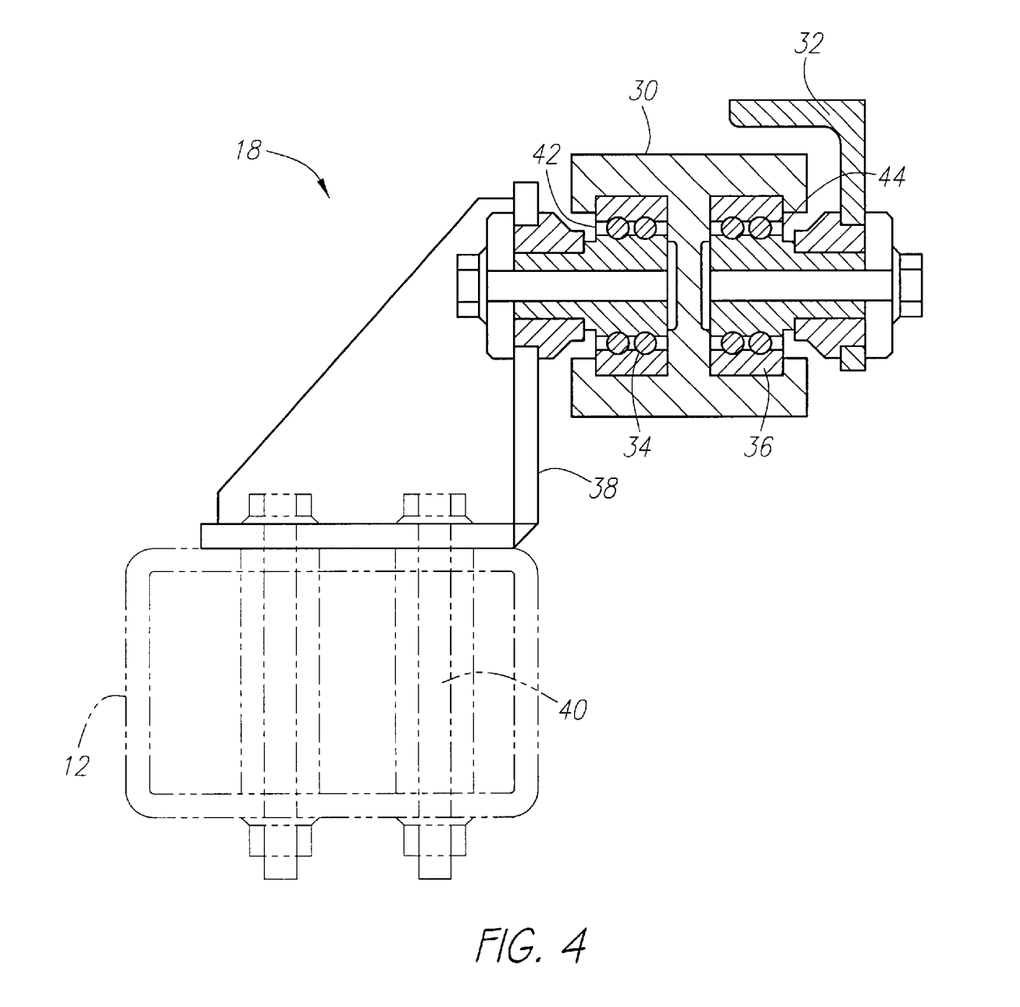
FIG. 4 is a right side view of the rail assembly of the vehicle shown in FIG. 1.

FIG. 3 shows the vehicle 10 in motion. FIGS. 1 and 3 illustrate that the floor deck assembly 18 is entirely contained within the vehicle body while the ride is operating. However, unlike FIGS. 1 and 2, FIG. 3 shows a ramp assembly 22 supported by the floor deck assembly 18 and stowed behind a backrest 24 mounted onto the support beams 12. Referring to FIG. 3, a companion seat 26 can be seen near the backrest 24. The companion seat 26 is an integral part of the vehicle 10 and part of the fiberglass vehicle assembly. The companion seat 26 enables another guest to accompany a guest in a wheelchair 20. A conversion seat 28 is mounted to the backrest 24. The conversion seat 28 allows the ride capacity to be maintained at all times, if no guest in a wheelchair 20 is being accommodated. The conversion seat 28 is of two-fold design and can easily be deployed and locked in place by a park operator. The compact design package of the conversion seat 28 makes the entire assembly capable of being hidden underneath the companion seating area. Guest restraints (not shown) are provided to ensure the safety of the guests while seated. While the floor deck assembly 18 can be seen in FIG. 3, the particular configuration of the floor deck assembly 18 is best illustrated in FIGS. 4 and 5.

Figure 5:
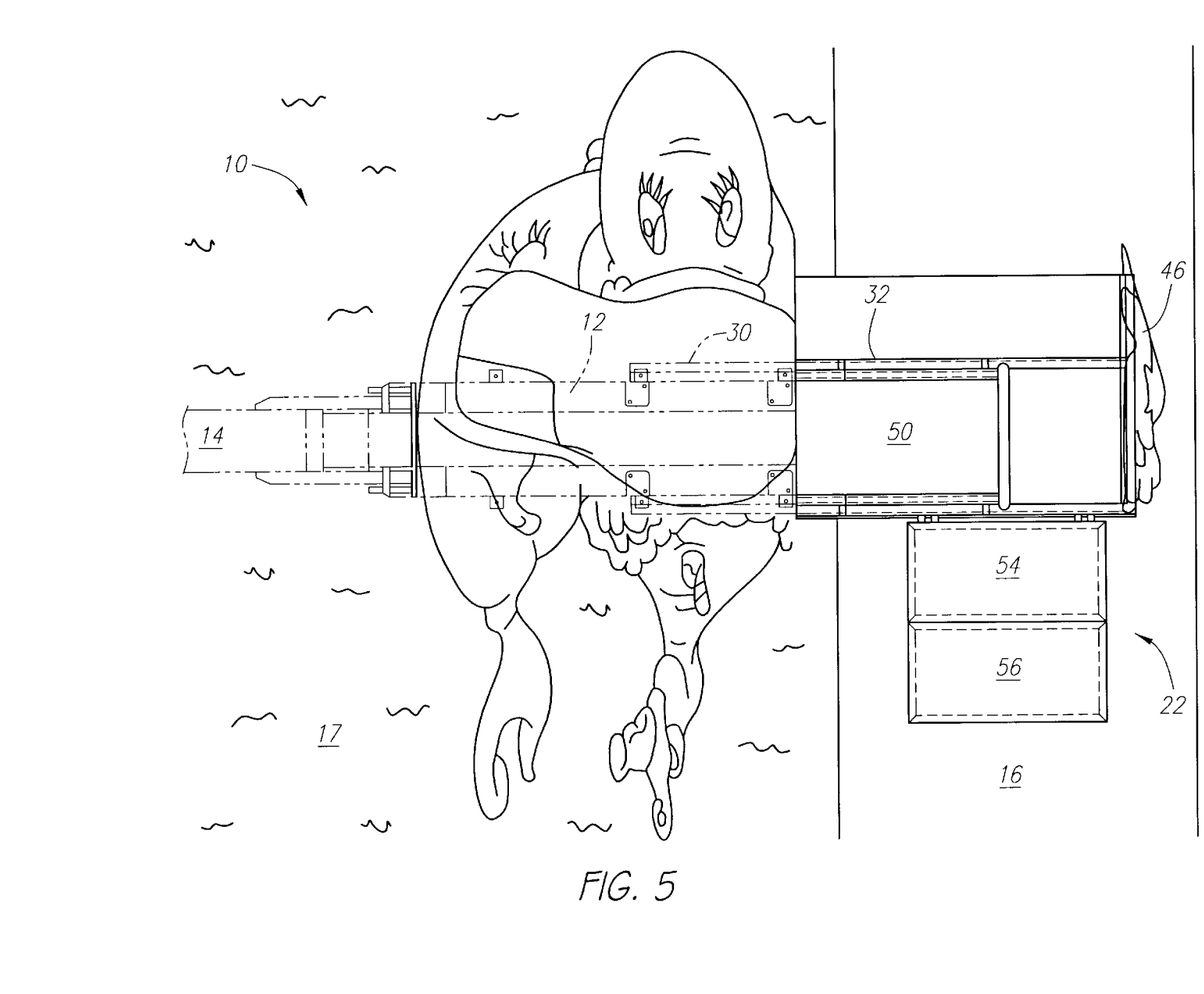
FIG. 5 is a top view of the vehicle shown in FIG. 1 with the ramp assembly in an extended position.
Figure 7:
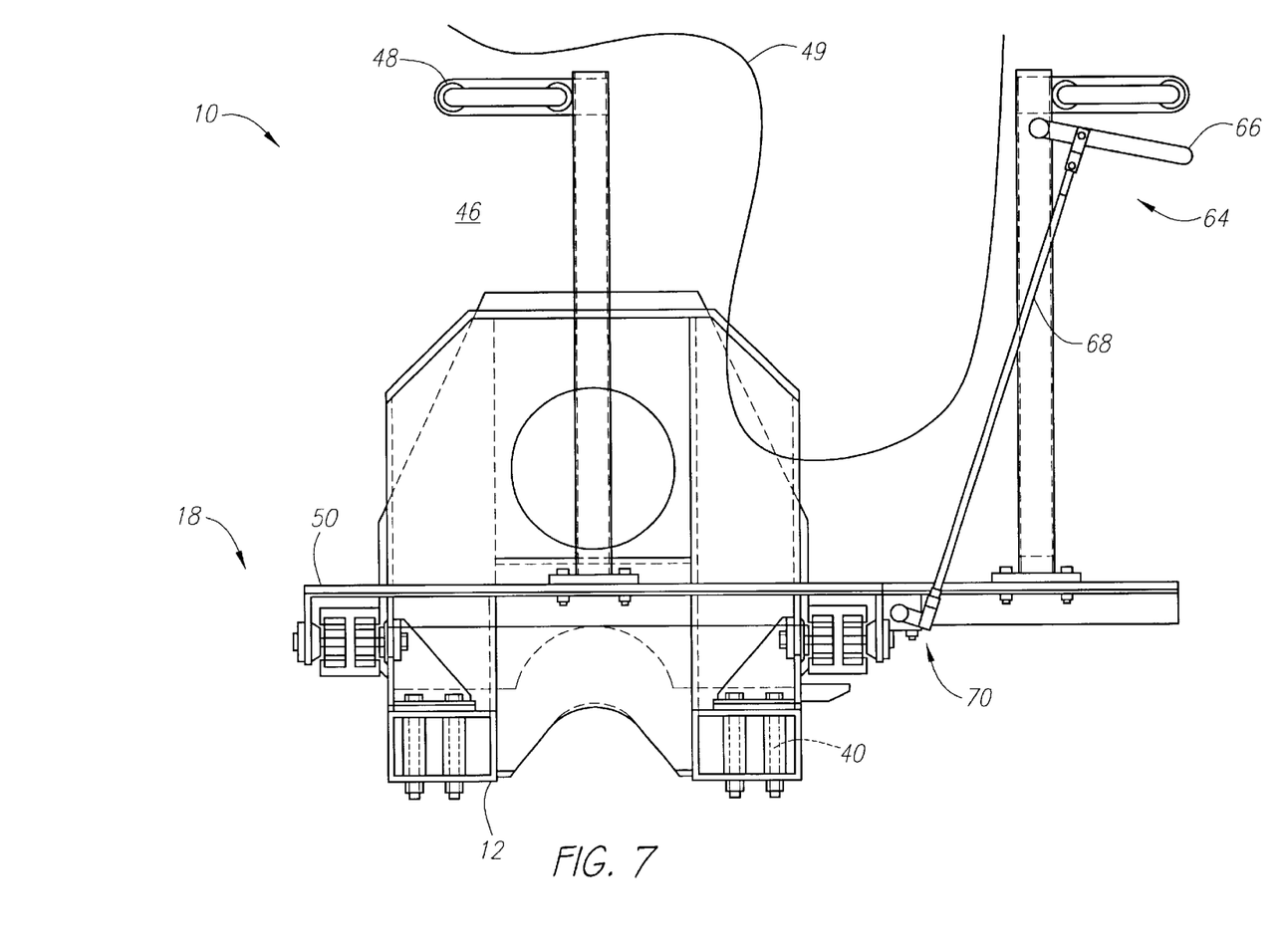
FIG. 7 is a right side view of the vehicle shown in FIG. 1 with the vehicle door unlocking device in the operational position.
Figure 8:
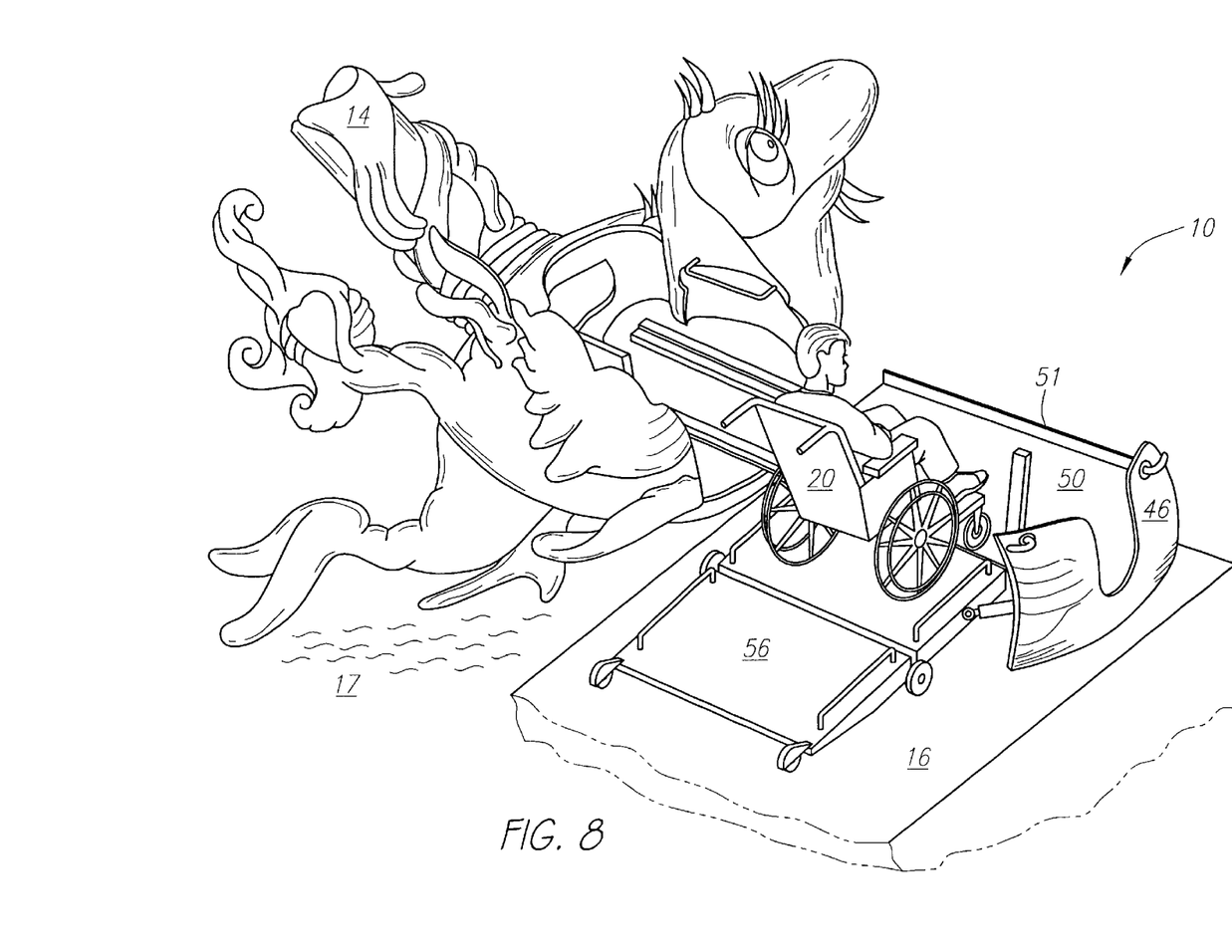
FIG. 8 is an environmental perspective view of the amusement ride vehicle with the ramp assembly in an extended position.

The floor deck assembly 18 preferably includes parallel I-track guiderails 30 slideably mounted to the support beams 12 and parallel L-track guiderails 32 slideably mounted to the I-track guiderails 30 for telescopically extending the floor deck assembly 18 away from the vehicle body toward the loading platform 16 when the vehicle 20 is at rest (as shown in FIG. 5). The floor deck assembly 18 has a first set of roller bearings 34 mounted to each support beam 12 via a bracket 38 and two hexagon screws 40. Each I-track guiderail 30 defines a first groove 42 and an opposing second groove 44. The first set of roller bearings 34 is slideably engageable with the first groove 42. A second set of roller bearings 36 is slideably engageable with the second groove 44. Each L-track guiderail 32 is mounted to the second set of roller bearings 36. Preferably, the roller bearings 34, 36 are self-lubricating. The L-track guiderails 32 support the floor or support platform 50 of the floor deck assembly 18. The door 46 (as shown in FIGS. 2, 5, and 7) of the vehicle is mounted on the support platform 50 opposite the arm 14. The door 46 has a pair of handles 48 (as shown in FIG. 7) for extending and retracting the floor assembly 18 from and into the body of the vehicle 10, respectively.

Figure 6:
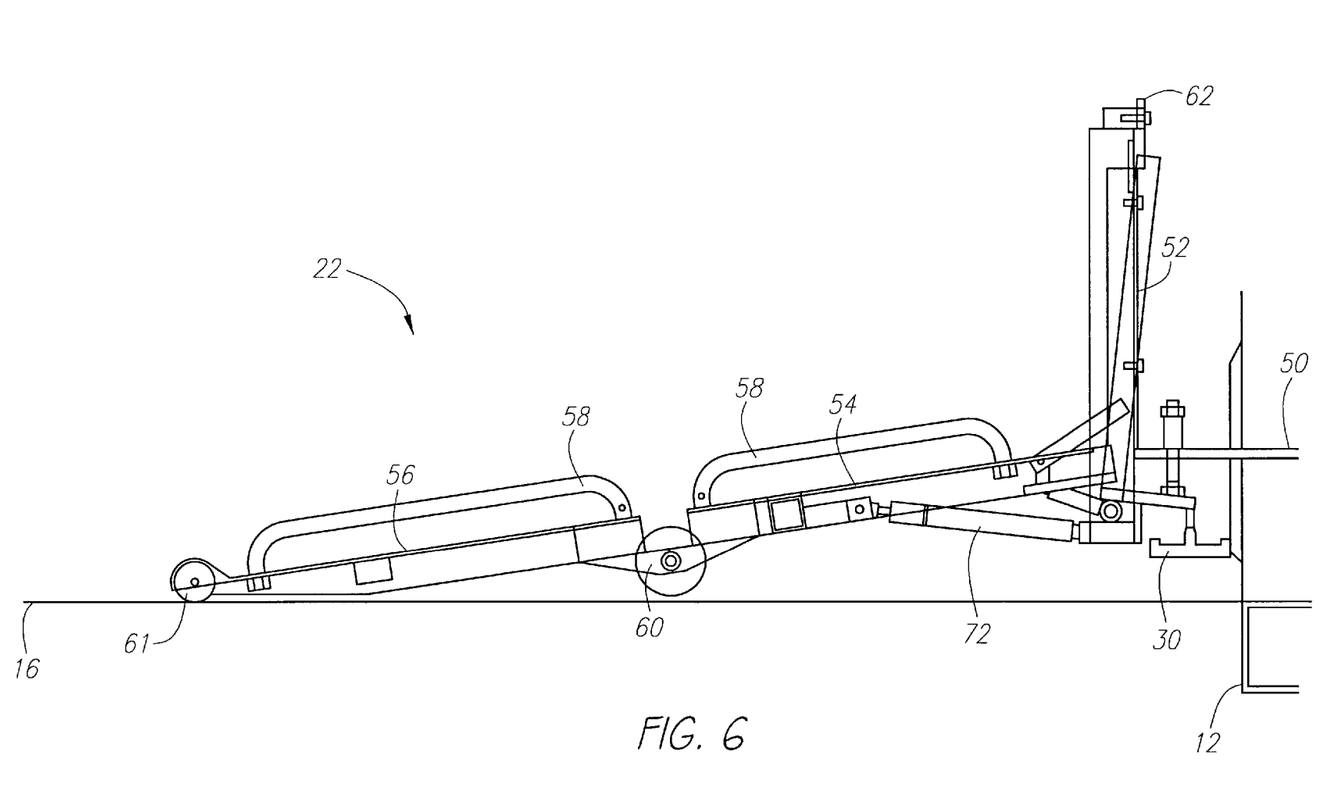
FIG. 6 is a right side view of the vehicle shown in FIG. 1 with the ramp assembly in an extended position.

Referring to FIGS. 5 and 6, the ramp assembly 22 is mounted to the support platform 50 of the floor deck assembly 18 near the door 46 of the vehicle 10. The ramp assembly 22 includes a frame 52, two plates 54, 56, a gas pressure cylinder 72, two sets of guide rails 58, two sets of rollers 60, 61, and an automatic latch mechanism 62. The frame 52 supports the first plate 54 at one end. The gas pressure cylinder 72 interconnects the frame 52 to the first plate 54. The first plate 54, foldably connected to the second plate 56, is adapted to swivel about the frame 52 for extending the ramp assembly 22 away from and at an angle to the floor deck assembly 18 to accommodate a guest in a wheelchair 20. In this manner, the ramp assembly 22 unfolds backward to the direction of the flow of the ride. This design holds the orientation of the guest in their wheelchair 20 to the normal running direction of the ride thus eliminating unnecessary turning of the wheelchair 20. When unfolded, the ramp assembly 22 measures approximately 33 inches long by 32 inches wide. Constructed of steel and made of anti-slip material, the ramp assembly 22 is light in weight for ease in handling by the park operator.

Each plate 54, 56 has a set of guide rails 58 for preventing wheelchair wheels from slipping off the ramp assembly 22. The guide rails 58 are also used as hand holds in the process of folding or unfolding the plates 54, 56 over the frame 52 for stowage or deployment purposes, respectively. Centrally located, the first set of rollers 60 provides stability in the center of the ramp assembly 22 when a guest in a wheelchair 20 is accessing the vehicle 10. The second set of rollers 61 prevents the ramp assembly 22 from damaging the loading platform 16 during deployment, as well as provides a smooth rolling action when the ramp assembly 22 makes contact with the loading platform 16 during stowage and deployment.

When stowed, the ramp assembly 22 is kept in place by the automatic latch mechanism 62 and is released by the park operator from the loading platform 16. The automatic latching mechanism 62 promotes safety since the ride will not start if the ramp assembly 22 is not locked in place.

Advantageously, the particular configuration of the ramp assembly 22 meets required ramp angle ratios and permits compact stowage without compromising safety, convenience, and undue expense in construction for enabling a guest in a wheelchair 20 to gain entry to the vehicle 10 from the loading platform 16 without leaving their wheelchair 20 and enjoy an amusement ride without turning their wheelchair 20.

Referring to FIG. 7, the door 46 of the vehicle 10 has two handles 48 near the entrance 49 and a door locking mechanism 64 disposed underneath one handle 48. The door locking mechanism 64 has a lever 66 attached to a rod 68 which is in turn mounted to a release bar 70 horizontally extending the length of the I-track guide rail 30 opposite the ramp assembly 22. The release bar 70 is adapted to maintain the door 46 in a locked position when the vehicle 10 is in motion. Similar to the automatic latch mechanism 62 of the ramp assembly 22, for safety purposes, if the door 46 is not completely pushed back and in the locked position, an override switch connected to the release bar 70 prevents the ride from running.

In operation, at a designated stopping position of the ride, the park operator opens the vehicle door 46 towards the loading platform 16. This further deploys the support platform 50 of the floor deck assembly 18 such that the support platform 50 passes over the water 17 and stops above the loading platform 16. The park operator will then unfold the ramp assembly 22 in preparation to load a guest in a wheelchair 20. In a situation where the guest in a wheelchair 20 has a companion, the companion must enter the vehicle 10 first, occupy the companion seat 26, and strap on the seat belt or guest restraint. The guest in a wheelchair 20 is then wheeled up the ramp assembly 22 by the park operator or self-propelled by the guest in a wheelchair 20. When the guest in a wheelchair 20 gets on board the support platform 50, the ramp assembly 22 is folded by the park operator and secured by the automatic latching mechanism 62. The vehicle door 46 is then pushed back inside the vehicle 10 in its fully retracted operational position. The guest in a wheelchair 20 is then further secured into the vehicle 10 by a seat belt or guest restraint. The unload procedure is the reverse of the above-identified load procedure. If no guest in a wheelchair 20 is being accommodated, the park operator will deploy the conversion seat 28 by unlocking and unfolding the conversion seat 28 hidden underneath the companion seating area.

FIGS. 9–12 show alternative ramp assemblies 22 to the one illustrated in FIGS. 1–8. Notwithstanding the different configuration of the ramp assemblies 22, all other aspects of the invention 10 shown in FIGS. 9–12 are identical to those aspects shown in FIGS. 1–8.

Figure 9:
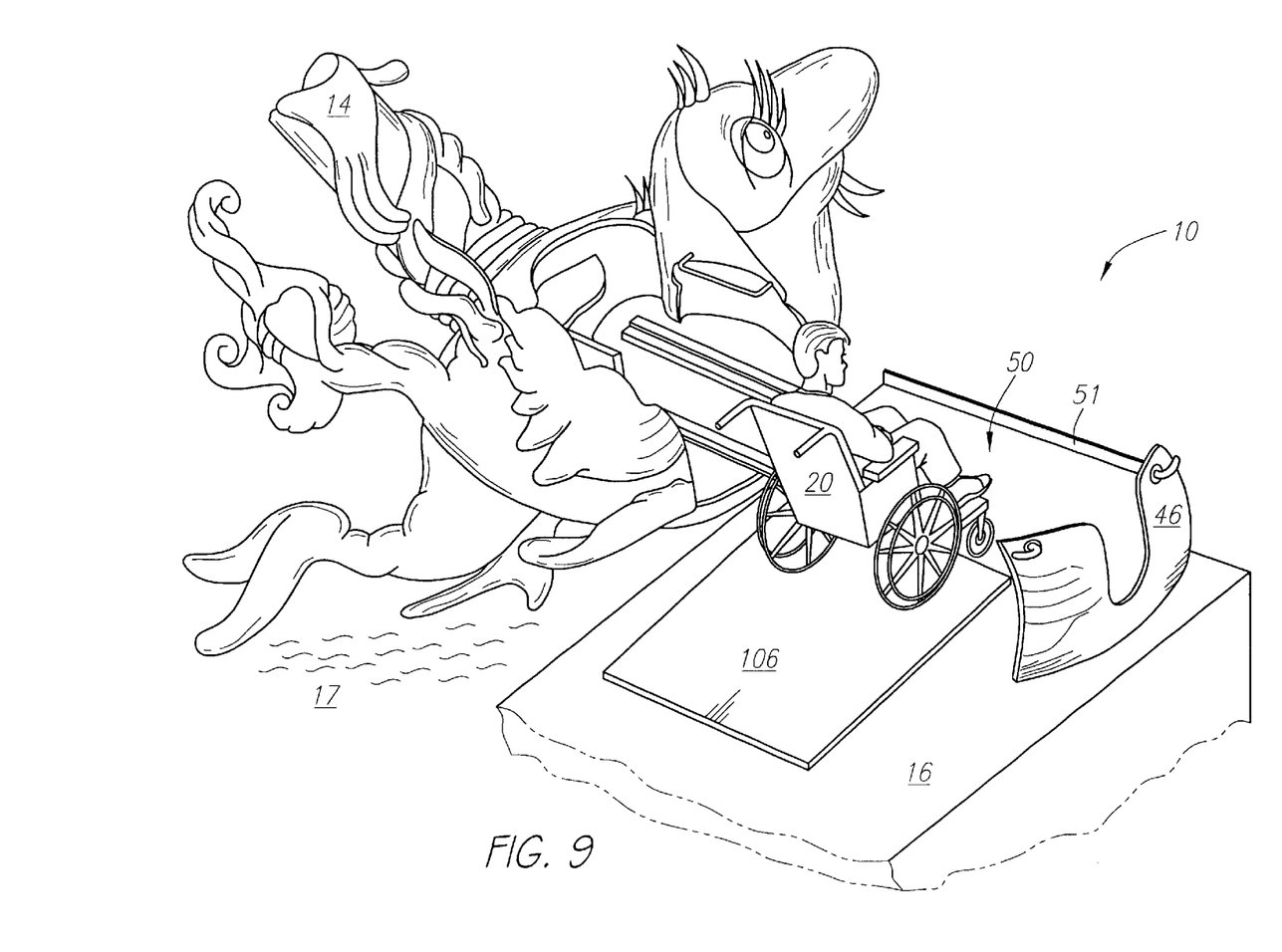
FIG. 9 is an environmental perspective view of the amusement ride vehicle with an alternative ramp assembly to the one shown in FIG. 1, illustrating the ramp assembly in an extended position.
Figure 10:
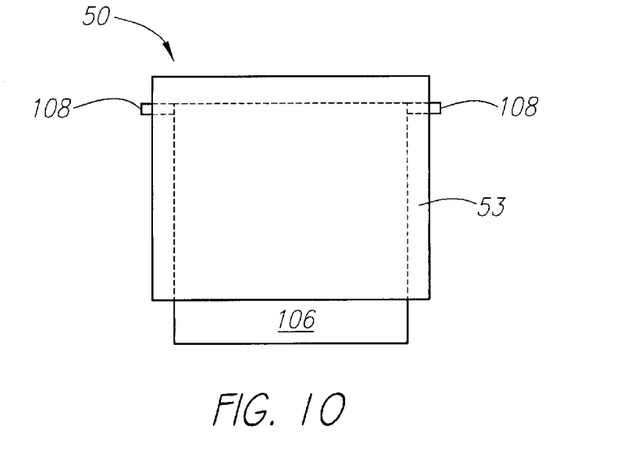
FIG. 10 is a top view of the ramp assembly shown in FIG. 9, illustrating the ramp assembly in the retracted operational position.
Figure 11:
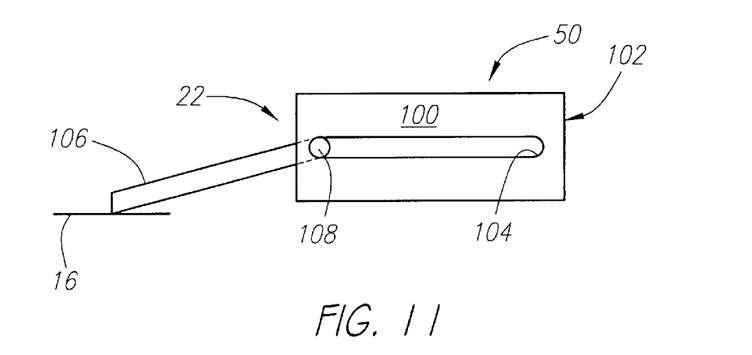
FIG. 11 is a right side view of the ramp assembly shown in FIG. 9.

Referring to FIGS. 9–11, the floor deck assembly 18 includes a support platform 50 defined by a top wall 53, sidewalls 100 defining a channel 104, and an end wall 102 joining one end of the sidewalls 100 and the top wall 53. A generally rectangular plate 106 has stops 108 orthogonally depending from one end thereof. The stops 108 are dimensioned to slide within the channel 104. The stops 108 advantageously permit the plate 106 to slide under the top wall 53 to a retracted operational position, as shown in FIG. 10, while preventing the plate 106 from being totally separated from the support platform 50 when the ramp assembly 22 is in an extended position for wheelchair access, as shown in FIGS. 9 and 11. The stops 108 also allow the plate 106 to pivot within the channel 104 for pivoting the plate 106 downward toward the loading platform 16 until contact with the loading platform 16 is made for wheelchair access. While not shown, a plurality of roller bearings or the like may be disposed about the channel 104 for mitigating friction between the stops 108 and the channel 104 when extending or retracting the plate 106. In general, the length of the plate 106 is greater than that of the top wall 53 such that plate 106 protrudes from under the top wall 53 even when fully retracted.

Advantageously, the park operator can easily and quickly grab the plate 106 for extending it away from the support platform 50. When fully extended, the park operator pivots the plate 106 downward until contact is made with the loading platform 16 for wheelchair access. All other aspects of the loading procedure are identical to that disclosed above when referring to FIGS. 1–8. When the ride is through, the unloading procedure is the reverse of the loading procedure.

Figure 12:
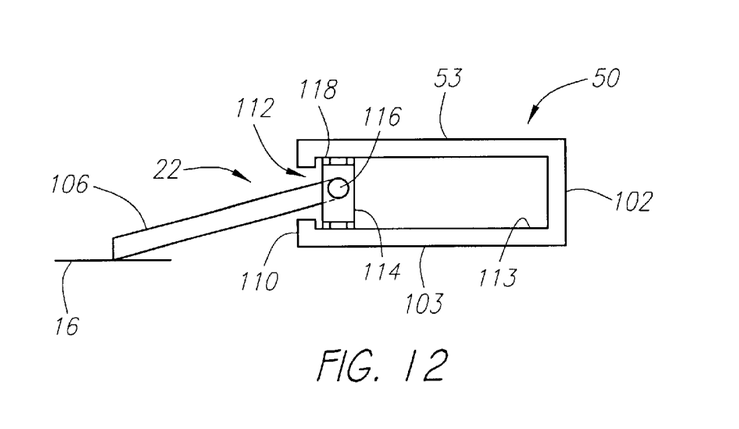
FIG. 12 is a right side view of an alternative ramp assembly to the one shown in FIG. 9, illustrating the ramp assembly in an extended position.

An alternative ramp assembly 22 to the one shown in FIGS. 9–11 is illustrated in FIG. 12. 15 Referring to FIG. 12, the floor deck assembly 18 includes a support platform 50 defined by a top wall 53, a bottom wall 103, and an end wall 102 joining one end of the top and bottom walls 53, 103. Opposite the junction between the top and bottom walls 53, 103 and the end wall 102, a jaw member 110 orthogonally depends from both the top and bottom walls 53, 103. The jaw members 110 define a mouth 112 for receiving a plate 106. The plate 106 is slideably and pivotally supported within a track 113 defined by the top and bottom walls 53, 103 and end wall 102 via a roller mount 114. The roller mount 114 optionally includes a plurality of roller bearings 118 mounted thereto for mitigating friction while sliding the roller mount 114 within the track 113. The plate 106 is pivotally mounted to the roller mount 114 via a bearing connector 116. To prevent wheelchair wheels from slipping off the plate 106 when a guest in a wheelchair is in the process of moving up and onto the top wall 53 of the support platform 50, the plate 106 in FIGS. 9–12 may optionally include guiderails (not shown) similar to but smaller than the guiderail 51 shown in FIG. 8 and 9.

Advantageously, the park operator can easily and quickly deploy the ramp assembly 22 by grabbing the plate 106 and extending the plate 106 to the extended position. Once extended, the park operator merely pivots the plate 106 until contact is made with the loading platform 16 for wheelchair access, as shown in FIG. 12. All other aspects of the loading procedure are identical to that disclosed above when referring to FIGS. 1–8. When the ride is through, the unloading procedure is the reverse of the loading procedure.

It will be apparent to those skilled in the art to design other ramp assemblies 22 equivalent to the embodiments shown in FIGS. 9–12. For example, an elongated t-shaped plate 106 may be slideably and pivotally disposed within a track similar to track 113 shown in FIG. 12. In operation, the plate 106 is extended away from the floor 50 until the protrusions of the t-shaped plate 106 engage jaw members similar to jaw members 110 shown in FIG. 12. When fully extended, the plate 106 pivots within the track 113 due to gravity.

Thus, an amusement ride vehicle that accommodates a guest in a wheelchair and another guest in a companion seat has been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An amusement ride vehicle comprising:
   a first support beam;
   a second support beam opposing the first support beam;
   a vehicle body supported by each beam;
   a floor deck assembly moveable away from each beam; and
   a ramp assembly disposed within and substantially transverse to the floor deck assembly in a stowed position and slideably moveable substantially orthogonally away from the floor deck assembly and then pivotable away from the floor deck assembly for loading or unloading a guest in a wheelchair.

2. The amusement ride vehicle according to claim 1 wherein the ramp assembly includes a plate slideably and pivotally supported by the floor deck assembly.

3. The amusement ride vehicle according to claim 2 wherein the floor deck assembly includes a support platform defined by a top wall, sidewalls defining a channel, and an end wall joining one end of the sidewalls.

4. The amusement ride vehicle according to claim 3 wherein the plate includes a stop depending therefrom, the channel adapted to receive the stop.

5. The amusement ride vehicle according to claim 4 wherein the plate is dimensioned to protrude from under the top wall when the ramp assembly is in a retracted, operational position.

6. The amusement ride vehicle according to claim 2 wherein the floor deck assembly includes a support platform defined by a top wall, a bottom wall, and an end wall joining one end of the top and bottom walls for defining a track.

7. The amusement ride vehicle according to claim 6 wherein the ramp assembly includes a roller mount slideably disposed within the track, the plate being pivotally mounted to the roller mount.

8. The amusement ride vehicle according to claim 7 wherein the top and bottom walls each have a jaw member depending therefrom.

9. The amusement ride vehicle according to claim 8 wherein the roller mount includes bearings mounted thereto for mitigating friction between the roller mount and the track.

10. The amusement ride vehicle according to claim 1 wherein the floor deck assembly includes a first set of bearings mounted to each beam, an I-track guiderail defining a first groove and an opposing second groove, the first set of bearings slideably engageable with the first groove, a second set of bearings slideably engageable with the second groove, and a L-track guiderail mounted to the second set of bearings.

11. An amusement ride vehicle for accommodating a guest in a wheelchair comprising:
    a frame;
    a vehicle body supported by the frame;
    a floor deck assembly slideably mounted to the frame and contained within the vehicle body when the vehicle is in motion and telescopically extended away from the vehicle body when the vehicle is at rest, the floor deck assembly including a support platform defined by a top wall, sidewalls defining a channel, and an end wall joining one end of the sidewalls; and a plate slideably and pivotally supported by the support platform for extending the plate substantially orthogonally away from the floor deck assembly and then pivoting the plate until contact with a loading platform is made, whereby a guest in a wheelchair may gain entry to the vehicle without leaving their wheelchair and enjoy an amusement ride without turning their wheelchair.

12. The amusement ride vehicle according to claim 11 wherein the plate includes a stop depending therefrom, the channel adapted to receive the stop.

13. The amusement ride vehicle according to claim 11 further comprising a companion seat supported by the frame.

14. The amusement ride vehicle according to claim 13 further comprising a conversion seat supported by the frame and deployed if no guest in a wheelchair is being accommodated.

15. The amusement ride vehicle according to claim 14 wherein the floor deck assembly includes a first set of bearings mounted to the frame, an I-track guiderail defining a first groove and an opposing second groove, the first set of bearings slideably engageable with the first groove, a second set of bearings slideably engageable with the second groove, and a L-track guiderail mounted to the second set of bearings.

16. An amusement ride vehicle comprising:

a first support beam;

a second support beam opposing the first support beam;

a floor deck assembly supported by each beam, wherein the floor deck assembly includes a first set of bearings mounted to each beam, an I-track guiderail defining a first groove and an opposing second groove, the first set of bearings slideably engageable with the first groove, a second set of bearings slideably engageable with the second groove, and a L-track guiderail mounted to the second set of bearings; and a ramp assembly supported by the floor deck assembly.

* * * * *